INVENTOR
EMANUEL MITTMAN

BY Frances H. Deef
ATTORNEY

United States Patent Office 3,483,057
Patented Dec. 9, 1969

3,483,057
APPARATUS AND PROCESS FOR PRODUCING
AN EMBOSSED PLASTIC LAMINATE
Emanuel Mittman, Queens, N.Y., assignor to W. R. Grace
& Co., New York, N.Y., a corporation of Connecticut
Continuation-in-part of application Ser. No. 354,797,
Mar. 25, 1964. This application Dec. 27, 1967, Ser.
No. 693,774
Int. Cl. B31f 1/10
U.S. Cl. 156—209
9 Claims

ABSTRACT OF THE DISCLOSURE

An apparatus and process for forming a uniform embossed laminate. A uniform pattern is applied to the plastic lamina of a laminate by utilizing a curvilinear crown on the roll to compensate for the deflection of the embossing and backup rolls. The laminating process includes the steps of embossing a uniform pattern into the outer surface of a film of thermoplastic polymeric material adhered to a hard plate-like substrate by means of the embossing roll and a backup roll while the film is at an embossing temperature. After embossing, the film is rapidly cooled to set the embossed pattern.

---

Figure 1:
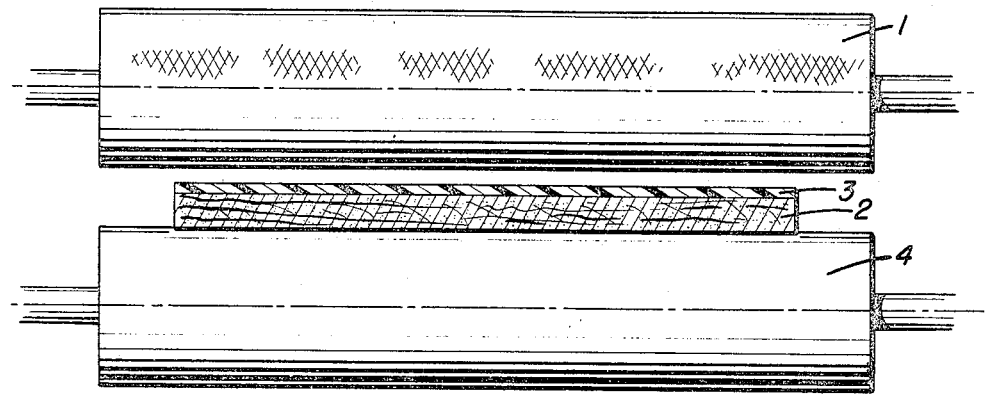

This application is a continuation-in-part of U.S. Ser. No. 354,797, filed Mar. 25, 1964, now abandoned.

This invention relative to embossed plastic laminates such as wood substrate-plastic lamina, and to a method of making such embossed laminates.

Laminates made up of a substrate, such as wood, metal, paper, and cloth, and a thermoplastic film or sheet are in common use. In recent years lamination has been used in the wood and wood products industry with materials, such as plywood and hardboard to upgrade these materials by improving durability and appearance, and thereby widen their area of usefulness.

While clear films and sheets have been laminated to furniture quality wood for protective purposes, the plastic film or sheet is normally used to impart a decorative appearance, as well as a more durable surface. The decoration may be simple pigmentation or grain printing or embossed patterns, such as wood grain or fabric.

In the case of embossed film, a film of 6-10 mils gauge is used. This film can be used on ordinary quality wood substrates because a film of this thickness can bridge irregularities in the surface and cover up surface defects. This is an expensive operation because of the weight of film used per square foot of coverage, and also the problem of quality control. The laminating operation requires that the film be forced against the substrate by a pressure of some hundreds of lbs. per lineal inch of roll nip, and at fairly high temperatures—critical control of pressure and temperature is essential to avert loss of embossing over portions of the article, or even totally. In these thick film embossed laminates, the surface properties of the laminate are identical to those of the plastic film alone.

Efforts have been made to use thin films of 1-3 mils gauge in wood substrate lamination. Because of the thinness of the film, even with pigmented film or printed, the surface defects of the substrate are visible. It has been necessary with thin film laminates to use only the highest quality wood substrates. Substrate defects such as chatter marks, irregular fiber patterns, surface defects, etc. must be removed by abrasion and polishing or burnishing immediately before lamination. The thin film laminates have been limited to smooth films because the laminating nip remove any embossing pressed into the film before the lamination operation.

Efforts have been made to emboss the thin film after lamination but these have been unsuccessful. It has not been possible to produce a laminate having a uniformly embossed pattern over the surface of the film. The conventional cylindrical embossing rolls give irregular distribution of the pattern and depth of the embossing.

In architectural and furniture use of these plastic laminates, the appearance of an actual wood grain in the embossed surface has made the thick film laminates preeminent. The smooth surfaced, printed grain, thin film laminates have been relegated to secondary and lower grade uses.

An object of the invention is a laminate comprised of a hard substrate, such as wood, and a thermoplastic lamina having a pattern uniformly embossed thereon. Another object of the invention is an apparatus and process for making the above-mentioned laminate.

A further object of the invention is such a laminate which does not require a smooth substrate surface. Another further object of the invention is a process for making such a laminate which process does not require a substrate free of surface defects, grain irregularities, irregular adhesive application, etc.

A preferred object of the invention is a laminate comprised of a hard substrate, especially wood substrate, and a thermoplastic film, especially a thin film, adhered to said substrate, which film has a pattern uniformly embossed in the outer surface of the film. Another preferred object of the invention is a process for making such a plastic film-hard substrate laminate.

Other objects of the invention will become apparent in the course of the detailed description of the invention.

The laminated article of the invention comprises a hard substrate affording structural strength to the article and a lamina of thermoplastic polymeric material adhered to the substrate which lamina has a pattern uniformly embossed in the outer surface thereof, and which embossed pattern is present in the surface of the substrate beneath the embossed lamina.

The process of the invention comprises introducing into an embossing zone a laminate comprising a hard plate-like substrate and a lamina of thermoplastic polymeric material adhered thereto where a uniform pattern is embossed into the outer surface of the lamina; during the embossing operation, the lamina is maintained at a temperature which permits embossing the desired pattern into the surface of the lamina but does not permit strike through; and substantially immediately after the embossing operation, the embossed lamina is cooled rapidly in order to set the embossed pattern.

In the preferred embodiment of the process invention, the embossing zone comprises an embossing roll and a backup roll where at least one of these rolls is crowned, i.e., a crown roll. Desirably the embossing roll is straight and the backup roll is crowned.

In another preferred embodiment, the embossing operation is carried out so as to impress into the surface of the substrate, beneath the lamina, the pattern embossed into the surface of the lamina.

Figure 2:
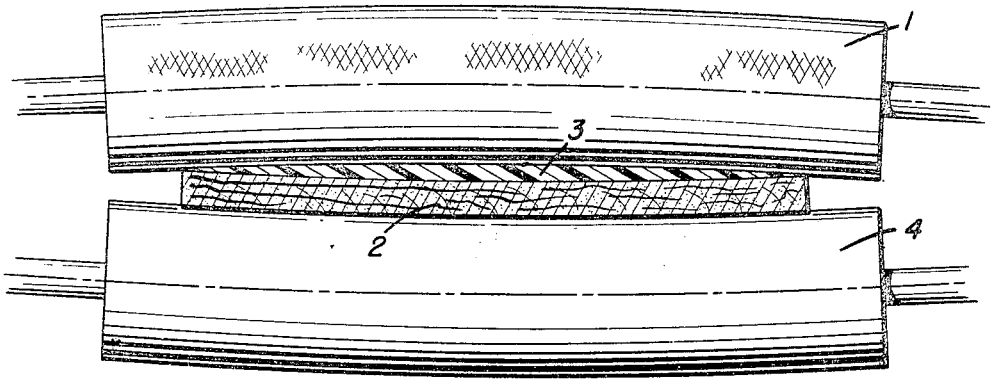
Figure 3:
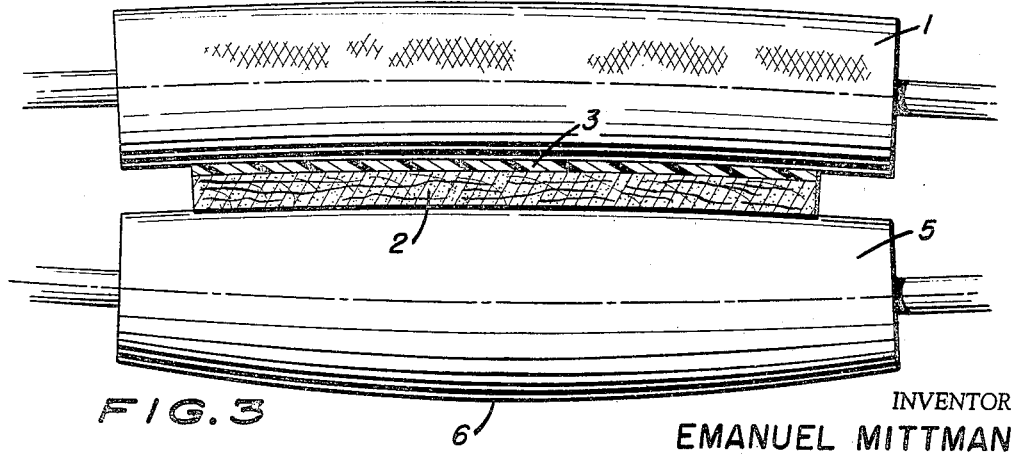

The invention will now be more specifically described with reference to the drawings in which;

FIGURE 1 shows a schematic representation of conventional cylindrical embossing and backup rolls in which pressure (stress) has not as yet been applied to the material to be embossed;

FIGURE 2 shows the rolls of FIGURE 1 after embossing pressure has been applied with the deflection of the rolls being exaggerated to emphasize the embossing problem encountered; and FIGURE 3 shows a schematic representation of the embossing and backup rolls of the present invention under embossing pressure with the deflection and curvilinear crown of the rolls being exaggerated to show the present solution of the problem.

In each of the figures, the center line of each roll shows the amount of the deflection of the roll.

In FIGURE 1 the embossing roll 1 and the backup roll 4 are used to emboss a laminate comprising a hard wood substrate 2 and a thermoplastic polymer film 3 adhered to the substrate. In FIGURE 1 the rolls show no deflection since they are not under embossing pressure or stress. In FIGURE 2 both the embossing roll 1 and the backup roll 4 show deflection (exaggerated) since the rolls are now shown under embossing stress as they press upon the wood substrate 2 and the thermoplastic polymeric film 3. The softened thermoplastic polymeric film 3 is thicker at the center of the rolls due to the deflection caused by the stress applied to the roll. In FIGURE 3 is shown the present solution to the problem of unevenness of the thermoplastic film during embossing.

In FIGURE 3 the backup roll 5 contains a curvilinear crown 6 which compensates for the deflection of both the embossing roll 1 and the backup roll 5. Since the deflection is compensated for, the softened thermoplastic polymeric material 3 on the hard substrate 2 is embossed evenly and uniformly during the embossing operation as shown. Either the embossing roll, the backup roll or both rolls can be crowned to compensate for the deflection. If a single roll is crowned, the curvilinear surface is such that it compensates for the deflection of both rolls. Preferably, the backup roll contains the curvilinear crown since it is difficult to crown the embossing roll without distorting the pattern to be produced on the thermoplastic polymeric film. The size of the curvilinear crown can be calculated by standard engineering procedures when the tensile properties of the material of the roll are known and the pressure to be applied to the nip is known.

The laminate introduced into the embossing operation of the invention comprises a hard, plate-like substrate and a lamina of thermoplastic polymeric material adhered thereto. While the lamina may be formed of self-adhesive plastic, commonly the substrate and the lamina are joined by an adhesive. Typical adhesives used in making the laminates are: natural and synthetic rubber latices, vinyl polymer emulsions, and Neoprene base adhesives.

The laminate may be completely formed before entry into the embossing operation of the invention or the substrate and lamina may, in some cases, be brought together and passed into the embossing operation substantially simultaneously.

The substrate is a hard, plate-like material which affords structural strength to the laminated article. The substrate may also be described as a hard, plate-like rigid or semi-rigid material. Especially suitable substrates are: wood materials such as plywood, hardboard-particularly dense hardboard, particle board, and chip board.

An important advantage of the process of the invention is that the substrate need not be flat and smooth as necessarily required for the presently known thin film laminates. The surface of the substrate may be mill-finish; or have grain irregularity, dents or nicks, such as develop in storage and handling; or be made flat, smooth and/or burnished before the laminating operation.

The term "lamina" is to be understood to mean a thin layer of defined plastic lying over a substrate. Lamina includes films and sheets. In the plastics art, a "film" is a lamina having a thickness of less than 10 mils and a "sheet" is a lamina having a thickness of at least 10 mils and typically, a thin sheet is 10–20 mils thick. A thin film is generally considered to be about 1–4 mils thick and usually about 1.5–3 mils thick. It is preferred that the lamina be a film, desirably thin film; or a thin sheet.

The lamina may be formed of any thermoplastic polymeric material which is capable of being formed into a film or sheet. Obviously in a particular situation the specific polymeric material must be capable of being embossed at a temperature not thermally injurious to the substrate. Illustrative thermoplastic polymeric materials are: acrylic solid polymer; cellulosics such as cellulose acetate, cellulose triacetate, cellulose butyrate and methyl cellulose; the fluorocarbons such as TFCE and FEP; the polyamides such as nylon; the polyesters such as Mylar, Videne and Scotchpak; the polyolefins such as polyethylene, polypropylene and copolymers thereof; the styrenes such as polystyrene and ABS polymer; and the vinyl polymers. It is to be understood the aforesaid list is not exhaustive of suitable polymers.

An especially suitable class of thermoplastic polymeric materials for use with wood substrates are the vinyl polymers. The term "vinyl polymers" as used herein is intended to be understood according to the practice of the plastics arts, i.e., homopolymers of and copolymers including vinyl halides, vinyl esters, and vinylidene halides. Typical monomers are vinyl chloride, vinyl fluoride, vinyl acetate, vinyl propionate, vinylidene chloride, and vinylidene fluoride. In addition to the copolymers of these monomers other copolymers of interest are ethylene-vinyl chloride and ethylene-vinyl acetate.

In general, the polymeric materials may be used in the unplasticized or plasticized condition. In the case of the vinyl polymers, polyvinyl chloride resin and vinyl chloride-vinyl acetate copolymer resin are of especial interest for paneling and furniture usage; it is preferred to use rigid or substantially rigid, i.e., not more than about 10% plasticizer, PVC resin or VC–VAc copolymer resin.

The lamina may be a smooth finish lamina or an embossed lamina. A complex pattern may be obtained by combining "an embossed lamina" pattern along with the pattern on the embossing means in the embossing operation of the invention. The invention is especially adapted to laminates having a smooth finish, thin film lamina.

The laminate may be any of those currently available on the market or may be a special combination of substrate and polymeric lamina. Illustrative of laminating processes now available is the Continuous Rotary Laminating Process described in Report No. 101, February 1963, "The Application of Various Films to Rigid and Semi-Rigid Substrates by the Continuous Rotary Laminating Process," Process Systems, Inc., Cleveland, Ohio.

The above defined laminate is introduced into an embossing zone wherein a uniform pattern is embossed into the outer surface of the lamina. The term "uniform pattern" is to be understood to mean essentially the same pattern is on the embossed lamina as is present on the embossing means and the same degree, i.e., there is essentially no variation in depth and clarity of the embossed pattern over the embossed surface of the lamina.

The embossing zone comprises embossing means for pressing the desired uniform embossed pattern into the surface of the lamina. In a plate press, the embossed plate and backup plate are designed to provide the distribution of pressure which will result in the uniform pattern.

It is preferred that the embossing means comprise an embossing roll and a backup roll at least one of these rolls is crowned, i.e., is a crown roll. Conveniently, the backup roll is crowned, and the embossing roll is straight. The amount of crown needed to afford a uniform embossed pattern is determined by the operating temperature, pressure, length of nip, type of lamina; these factors may be readily correlated by those of ordinary skill in this art.

An important feature of this invention which is particularly beneficial when the lamina is a thin film, lies in using an embossing means designed to impress the desired pattern not only into the surface of the lamina but also into the surface (skin) of the substrate which is adjacent to the lamina.

This impressing of the embossed pattern into the skin of the substrate results in several unexpected benefits, among which are: A far stronger bond between the substrate and the embossed lamina than existed in defined laminate. A reorientation of the skin of the substrate that eliminates grain irregularities and other surface defects; the appearance of the laminate is equally as good with ordinary wood material substrate as with a smooth, burnished substrate. A hardening of the lamina, i.e., the embossed lamina is much more resistant to scuffing and scouring than the defined adhered lamina or the lamina before adhesion to the substrate. In the case of a wood grain embossed pattern, thin film-hard board laminate of the invention, a more realistic appearance and feel are present than in a conventional thick film embossed laminate. The advantages make this particular embodiment of the laminate of the invention especially suitable for furniture.

The embossing operation of the invention is carried out at a temperature which permits embossing the pattern therein but does not permit strike through—creating holes in the lamina. The temperature is dependent on the particular lamina and to some extent the pressure being used. Commonly, the embossing temperature will be at least about 150° F.

The defined laminate may be introduced into the embossing zone at ordinary temperatures and be brought to the desired embossing temperature through the hot embossing means. However, it is more convenient to introduce a heated lamina surface—at about the embossing temperature.

In a preferred embodiment of the process, the embossing operation of the invention will follow substantially immediately after the defined laminate has been produced; the defined laminate while still at about laminating temperature is introduced into the embossing zone.

If the defined laminate is taken from storage at ordinary temperature, preferably it is preheated before introduction into the embossing zone.

The embossing operation is carried out at a pressure great enough to impress the pattern into the outer surface of the lamina. In the preferred operation the pressure is great enough to not only emboss the lamina but also to impress the pattern into the surface (skin) of the substrate beneath the lamina. This pressure is dependent on the nature of the substrate, the embossing temperature, and to some extent, the nature of the lamina.

The hot embossed pattern is set by rapidly cooling the embossed lamina substantially immediately after the embossing operation. It is preferred to cool by flooding, e.g. by a shower spray, the embossed surface with a liquid which is inert to the lamina. Liquid water is a suitable coolant. For many uses, a protective wax film is desirable over the embossed lamina. A wax finish is easily imparted to the embossed lamina by using as the coolant a water base-wax emulsion. The water is evaporated leaving a wax finish on the surface of the embossed pattern.

In a preferred embodiment of the invention, the substrate is a wood material, such as plywood, hardboard, particle board or chip board, and the lamina is a smooth surface vinyl polymer film. The embossing means comprises an embossing roll and a backup roll, at least one of which rolls in a crown roll; it is convenient to use a straight embossing roll and a crowned backup roll. Desirably the film is introduced into the embossing zone at the embossing temperature of about 200°–250° F. The pattern is embossed into the film and pressed into the surface (skin) of the substrate beneath the film by applying an embossing pressure of about 4000–6000 lbs. per lineal inch of nip of said rolls. The hot embossed lamina is rapidly cooled to set the pattern by flooding the embossed lamina after it leaves the rolls with a water base-wax emulsion. Water is sucked from the surface to leave a wax finish embossed lamina where the pattern is uniformly embossed into the lamina surface and the skin of the substrate beneath the lamina.

ILLUSTRATION

Smooth, rigid polyvinyl chloride resin film, standard 2 mils gauge printed to resemble stained wood laminated to a dense hardboard substrate was embossed with patterns such as, quarter cut oak grain and coarse woven fabric, like monk's cloth. The embossing temperature was around 225° F. and the smooth laminate was preheated to in the region 200°–250° F.

The embossing roll was heavy wall construction, approximately 12 inches in diameter and the roll was run at laminate speeds of 10–20 feet per minute. The pressure varied somewhat with the density of the hardboard but was around 5,000 lbs. per lineal inch of nip.

The backup roll was a heavy wall steel cushion roll, 12 inches in diameter. The backup roll was crowned 22 mils (0.022") in a 48 inch nip; this is twice the calculated deflection of the embossing roll. This pressure and crown provided an embossing nip of uniform opening during production of the embossed laminate and gave a uniform pattern over the nip of the laminate.

The hot embossed laminate was quenched to set the pattern with water base-wax emulsion, applied at room temperature.

The laminates produced as above had a finished wood grain appearance, closely resembling quarter-cut oak; the film was tough and very resistant to scoring and scratching; none of the surface characteristics present in the substrate and visible in the smooth laminate were evident in the embossed laminate. Tests run with chip board gave the same high quality surface appearance of the laminate.

These embossed thin film laminates are suitable for the most exacting structural and furniture usages.

What is claimed is:

1. A process for making an embossed laminate which comprises:
   (A) adhesively applying to a surface of a substrate formed of a wood material, a smooth surfaced vinyl polymer film to form a laminate of polymer film to wood;
   (B) passing said laminate into an embossing means having an embossing roll and a backup roll, at least one of said rolls having a curvilinear crown,
   (C) embossing the film portion of the laminate while said film is at a temperature of at least about 150° F. and less than the strike through temperature by contacting said film with said embossing roll under an embossing pressure of about 4000–6000 pounds per linear inch of nip of said rolls, said pressure sufficient to impress into the surface of said substrate the pattern embossed into the film;
   (D) substantially immediately after embossing, cooling said embossed film with water or a water base-wax emulsion to set the pattern embossed in said film.

2. The process of claim 1 wherein the film temperature is about 200° F.–250° F.

3. The process of claim 1 wherein the film has a thickness of 2 mils gauge.

4. The process of claim 1 wherein the wood material is plywood.

5. The process of claim 1 wherein the wood material is hardboard.

6. The process of claim 1 wherein the vinyl film is polyvinyl chloride resin film.

7. The process of claim 1 wherein the vinyl film has a printed surface to resemble stained wood.

8. The process of claim 1 wherein the backup roll has a 12 inch diameter, and a crowned surface of 22 mils in a 48 inch nip.

9. The embossed laminate prepared by the process of claim 1.

References Cited

UNITED STATES PATENTS

| | | | |
|---|---|---|---|
| 3,121,642 | 2/1964 | Biskup | 118—46 |
| 2,306,046 | 12/1942 | Duggan et al. | 161—234 |
| 2,551,005 | 5/1951 | Johnson | 101—25 X |
| 2,662,002 | 12/1953 | Sunderhauf et al. | 101—22 |
| 2,666,726 | 1/1954 | King et al. | 101—25 |
| 2,759,866 | 8/1956 | Seymour | 161—251 X |
| 3,022,207 | 2/1962 | Lang | 161—251 X |
| 3,150,031 | 9/1964 | Powell | 156—209 |
| 3,180,779 | 4/1965 | Conger et al. | |
| 3,239,365 | 3/1966 | Petry | 156—209 X |
| 3,305,419 | 2/1967 | Voelker | 156—209 |

OTHER REFERENCES

Waldron Embossing Machines, John Waldron Corp., p. 3, 5, 7, 8 and 9, received U.S. Patent Office May 13, 1952.

ROBERT E. PULFREY, Primary Examiner

E. H. EICKHOLT, Assistant Examiner

U.S. Cl. X.R.

101—25, 426